United States Patent [19]

Aykan et al.

[11] 4,416,916

[45] Nov. 22, 1983

[54] THIN FILM SOLAR ENERGY COLLECTOR

[75] Inventors: Kamran Aykan, Monmouth Beach; Robert J. Farrauto, Westfield; Clinton F. Jefferson, Millburn; Richard D. Lanam, Westfield, all of N.J.

[73] Assignee: Engelhard Corporation, Iselin, N.J.

[21] Appl. No.: 354,831

[22] Filed: Mar. 4, 1982

[51] Int. Cl.³ .................. B05D 1/38; B32B 17/06; B32B 15/18; B32B 15/04
[52] U.S. Cl. .................. 427/160; 126/901; 428/630; 428/632; 428/639; 428/640; 428/670; 428/673
[58] Field of Search ............... 126/901; 428/630, 632, 428/639, 640, 670, 673; 427/160

[56] References Cited

U.S. PATENT DOCUMENTS 3,978,272 8/1976 Donley ................... 427/160 X
4,286,009 8/1981 Griest ................... 126/901 X Primary Examiner—James R. Hoffman

[57] ABSTRACT

A multi-layer solar energy collector of improved stability comprising: (1) a substrate of quartz, silicate glass, stainless steel or aluminum-containing ferritic alloy; (2) a solar absorptive layer comprising silver, copper oxide, rhodium/rhodium oxide and 0–15% by weight of platinum; (3) an interlayer comprising silver or silver/platinum; and (4) an optional external anti-reflective coating, plus a method for preparing a thermally stable multi-layered solar collector, in which the absorptive layer is undercoated with a thin film of silver or silver/platinum to obtain an improved conductor-dielectric tandem.

23 Claims, 3 Drawing Figures

EMISSIVITY VS. AGING TIME FOR
COMPOSITION 65Ag / 7.0Pt / 27.6 CuO / 0.4 $Rh_2O_3$
ON QUARTZ

DATA ARE PRESENTED FOR AGING TEMPERATURES OF
500 AND 600° C

THIN FILM SOLAR ENERGY COLLECTOR

This invention relates to a multi-coated selective solar energy collector and method for preparation.

More specifically, this invention relates to a solar energy collector in which an absorber film containing silver, copper oxide, rhodium/rhodium oxide and 0%–15% platinum by weight, is undercoated with silver or silver/platinum to form a conductor-dielectric tandem. The resulting collector exhibits marked improvements in solar absorptance and emittance, and improved stability at high temperatures.

BACKGROUND

When radiant energy from the sun strikes a solar collector, some of the energy is reflected or transmitted and lost, and the remainder is either absorbed or re-radiated into the atmosphere. Most of the sun's energy is emitted at wavelengths below 2.0 microns and a substantial amount of such energy is normally reradiated into the atmosphere at a longer wavelength, such as infrared radiation. It is desirable, therefore, for solar collectors to have a high capacity for energy absorption below 2 microns in combination with low emissivity at the longer wavelengths.

Blackbodies are known to absorb a significant amount of energy in the solar spectrum but, unfortunately, also re-radiate most of the energy in the infrared (IR) spectrum and, therefore, are generally unsatisfactory as collectors.

Preferred absorptive coatings or films, which optimize solar absorptance and inhibit emissivity in the longer wavelengths, are generally known as "selective absorbers". A good selective absorber may have, for instance, a solar absorptance level ($\alpha$) approaching a value of 1.0 and a thermal emittance or emissivity ($\xi$) approaching zero.

The principal factors affecting absorptance, emittance and thermostability are (1) the physical and chemical properties of the absorber film, (2) the nature of the substrate to which they are applied, and (3) the nature and functional properties of the diffusion barrier or interlayer between said film and said substrate.

Metals such as silver, gold and aluminum, for instance, have low emissivities, but are low absorbers of solar energy and, alone, are not generally useful for collector purposes. They can, however, be incorporated into a selective solar absorber collector as a low emissivity component. Some metals, however, are unstable at higher operating tempertures, resulting in rapid deterioration of their low emissivity properties, and substantially diminishing the effectiveness of the collector. Silver films of earlier solar energy collectors, in particular, exhibit a tendency to agglomerate at higher operating temperatures.

THE INVENTION

Figure 1:
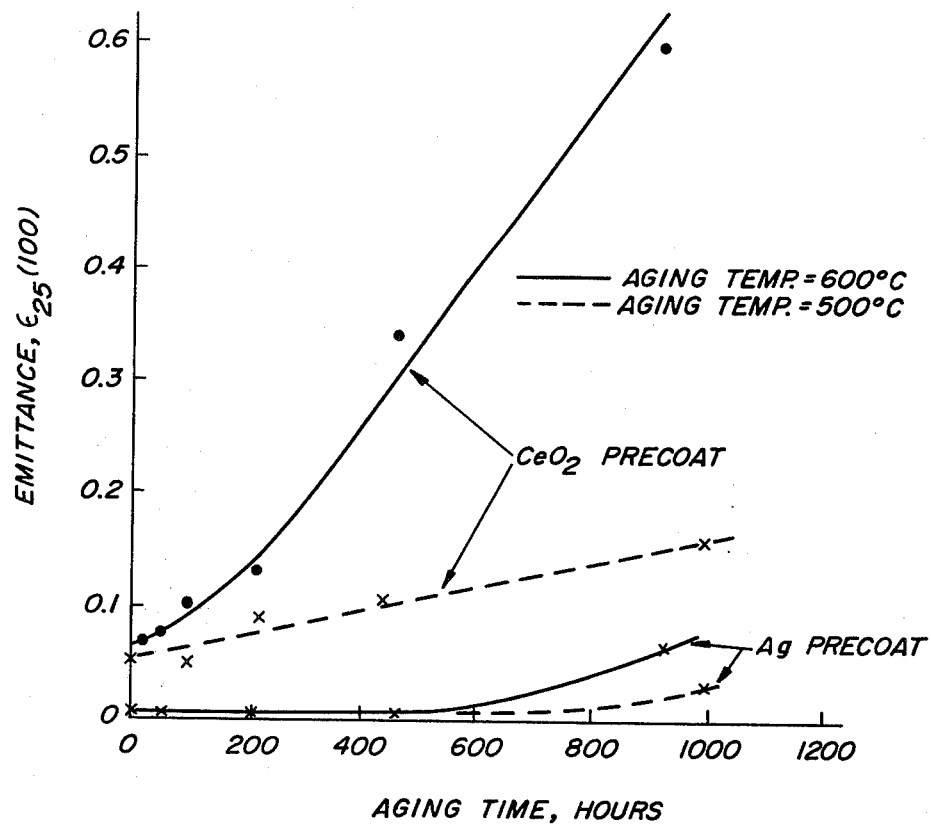
FIG. 1 is a graph of Emissivity vs. Aging Time for the specified compositions.

One object of this invention is to provide a thin film solar energy collector, which can absorb essentially all of the radiant energy with impinges upon its surface within the wavelength band of about 0.3–2.0 microns. This absorbed energy can then be converted into heat or an electrical current via thermal-electric conversion techniques, provided that it is not otherwise re-radiated into the atmosphere.

The solar collectors of this invention exhibit high absorptivity, low emissivity and a resistance to degradation at temperatures up to about 700° C., inclusive of a useful high commercial operating range of about 300° C.–600° C. Such collectors, i.e. the combination of absorptive film and interlayer, are characterized by a conductor-dielectric structure having optical stability at high temperatures, with excellent thermal emittance properties.

Solar energy collectors of this invention contain
(a) a substrate of quartz, silicate glass or a stainless steel, inclusive or aluminum-, chromium-, iron-, and nickel-containing alloys and can also contain minor quantities of other elements, such as cobalt and/or yttrium.
(b) a solar absorptive layer containing silver, copper oxide, rhodium/rhodium oxide and 0%–15% by weight of platinum;
(c) an interlayer of silver or silver/platinum in contact with (a) and (b).

As desired, it is also found useful to apply at least one anti-reflective coating, such as cerium oxide or tantalum oxide, to the absorptive layer to effectively cancel out light reflected from its lower and upper surfaces.

The substrate "(a)" layer of the present invention usefully comprises stainless steel in wrought or cast form, and examples of such substrates within the scope of the present invention include, (all components being represented in weight-percent relationship):

304 Stainless Steel: Mn: 2.0; Cr: 18.20; Ni: 8-10; Fe: 67.5-72.
316 Stainless Steel: Mn: 2.0; Cr: 15-18; Ni: 10-14; Fe: 66-72.
406 Stainless Steel: Cr: 13, Al: 4.2; Fe: 82.54; Ti: 0.26.
408 Stainless Steel: Mn: 0.3; Cr: 12.03; Ni: 0.2; Al: 1.36; Nb: 0.73; Ti: 0.37; Fe: 85.01.
409 Stainless Steel: Mn: 0.46; Cr: 10.80; Ni: 0.37; Al: 0.085; Ti: 0.43; Fe: 87.85.
439 Stainless Steel: Mn: 0.34; Cr: 18.70; Ni: 0.22; Al: 0.067; Ti: 0.76; Fe: 79.91.
Inconel ® 601: Cr: 23, Ni: 61.5; Al: 1.35; Fe: 14.5.
Fecralloy ®: Cr: 15; Al: 5; Y: 0.3; Fe: 79.7. Kanthal* A-1; Cr: 22; Al: 5; Co: 0.5; Fe: 72.5.

*Trademark of Kanthal Corporation, Sweden.

The absorptive "(b)" layer, as above-described, has the ability to absorb large amounts of solar energy having wavelengths of less than 2.0 microns, has a maximum solar absorptance approaching 0.9, and is further characterized by a thermal emittance of less than about 0.1. Moreover, it is resistant to degradation under atmospheric conditions at temperatures up to about 700° C.

While the interacting functional properties of the components of this solar absorptive layer are not fully known, the stability and efficiency of the solar collectors are enhanced by the tandem combination of the (b) and (c) layer. In general, the copper oxide component is found to be associated with solar absorption efficiency. The silver or silver/platinum interlayer component, on the other hand, is found to act generally as an infrared reflector (low emittance) which, in combination with copper oxide, also supplements the solar absorptive properties of the latter. The rhodium/rhodium oxide component is found to be associated with stabilization of the optical properties of the collector, particularly by minimizing agglomeration during preparation. The platinum component, on the other hand, is functionally useful in improving stability by agglomeration at higher operating temperatures.

Components of the absorptive layer within the scope of the present invention are usefully present in a concentration range of about 50%–90% by weight silver, 9%–49.9% by weight copper oxide; 0.1%–1% by weight rhodium/rhodium oxide*, and 0%–15% by weight platinum, and preferably within concentration ranges of 50%–75% silver, 9–49.9% copper oxide, 0.1%–1% rhodium/rhodium oxide, and 0%–15% by weight platinum, the latter component being generally added at the expense of the silver component, although the present invention is not so limited.

*calculated throughout as the oxide ($Rh_2O_3$).

Of further interest are (b) solar absorptive components utilizing silver 50–65%, copper oxide 33.3–44.7% and rhodium/rhodium oxide 0.3%–0.7% alone or with 0–15% platinum by weight.

In each case, the (b) component, as described above, include at least one anti-reflective coating, such as cerium oxide.

Suitable solar absorptive layers within the present invention include the following components:

| Components vs. % By Weight of Absorptive Layer | | | |
|---|---|---|---|
| Ag | CuO | $Rh_2O_3$ | Pt |
| 50 | 49.9 | .1 | 0 |
| 55 | 44.7 | .3 | 0 |
| 66 | 33.3 | .7 | 0 |
| 65 | 27.4 | .4 | 7.2 |
| 50 | 34.0 | 1.0 | 15 |
| 75 | 21.0 | 1.0 | 0 |
| 65 | 19.9 | .1 | 15 |
| 65 | 27.6 | .4 | 7.0 |
| 60 | 37.6 | .4 | 2 |
| 90 | 9.0 | 1.0 | 0 |

The interlayer or substrate precoat (c) usefully comprises at least one layer totaling about 0.1–10 microns in thickness and preferably, a thin layer of about 0.1–1 micron. For purposes of the present invention, such precoat is preferably applied as a mixture of silver and platinum resinate solutions, or can be made up of more than one layer of resinate solutions or of applied acid solutions, which are dried and fired to obtain the metal layer or film. Sputtering, ion plating, electrodeposition, and thermal evaporation techniques are also found useful for applying such a layer.

As above noted, the stability and efficiency of solar collectors are enhanced by the tandem combination of the absorptive film and silver or silver/platinum interlayers. This is particularly apparent in collectors of low film weight, which are transparent in the infrared and thus permit the silver or silver/platinum undercoat to function as a low infrared emitter.

Figure 2:
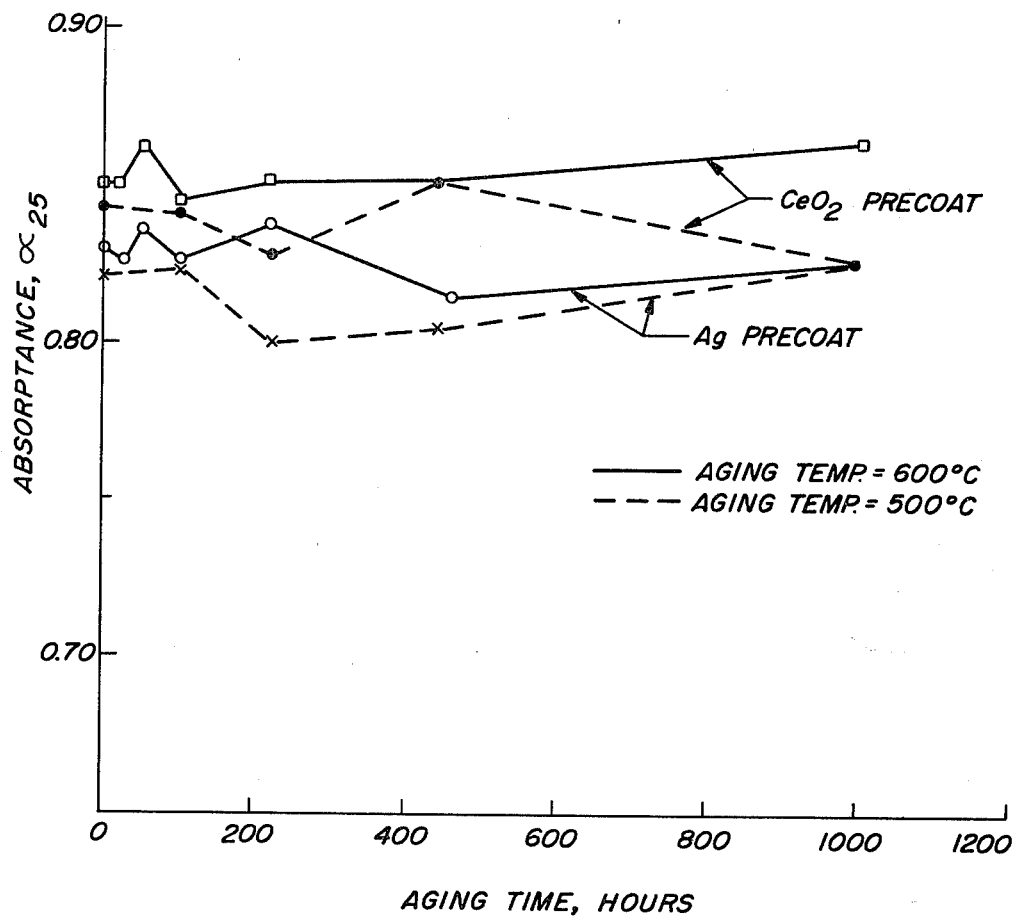
FIG. 2 is a graph of Absorptance vs. Aging Time for the specified compositions.

The effect of a silver precoat or interlayer (c), compared to a comparable cerium oxide precoat, is illustrated by FIGS. 1 and 2 which compare emittance and absorptance levels for films comprised of Ag/Pt/CuO/Rh/$Rh_2O_3$, which are aged at various temperatures and time. On the basis of this data, it is evident that interlayers having a silver precoat exhibit improved thermal stability compared to interlayers or precoat consisting of cerium oxide. The tandem structure formed by the silver precoat and solar absorber film of the present invention is particularly advantageous in stabilizing and maintaining good emittance properties, $\xi_{25}(100)$ with a negligible effect on absorptivity.

Solar energy collectors of this invention are conveniently obtained by a multiple-coating process, in which a thin silver or silver/platinum precoat film or layer, as above described, is deposited onto quartz or other defined substrate surface, dried, fired at a temperature up to about 800° C.; and the solar absorptive layer and optional anti-reflective coating thereafter applied.

More specifically, a solar collector of improved thermal stability within this invention is prepared by: (A) uniformly depositing a thin silver- or silver/platinum-interlayer onto a substrate as above-defined, preferably as an organo metallic solution, such as a resinate solution, by spin coating techniques; (B) drying and calcining the coated substrate as needed at a temperature up to about 800° C., preferably within the range of about 400°–800° C.; and thereafter, (C) uniformly depositing silver, copper oxide, rhodium/rhodium oxide and 0–15% platinum as one or more metallo-organic solutions, such as resinate solutions, onto the surface of the silver- or silver/platinum-coated substrate, and (D) drying and calcining the coated substrate to obtain the desired collector. As above noted, one or more anti-reflective layer(s), such as cerium oxide or tantalum oxide, can also be added as part of the absorptive layer. Such can be conveniently applied by spin coating in the form of a metallo-organic (i.e., resinate) solution, dried and fired in the above manner.

More specifically, collectors of the present invention can be prepared by soaking the substrate in Chromerge ®, or similar cleaning solution, for several minutes at room temperature, then repeatedly rinsed with deionized water, and dried. The substrate is placed on a spin coater and an excess of a 5%–15% silver or silver/platinum resinate solution placed at its center, and rotated at 600–2000 RPM for up to about 15 seconds, to uniformly distribute the resinate solution over the substrate surface. The substrate is then dried and calcined up to 1 hour at a temperature up to about 800° C. (preferably 400° C.–800° C.), to decompose the resinate and obtain a thin film or overlay of silver or silver/platinum metal on one side, having a uniform thickness within the above-indicated range. Known techniques for application other than spin coating, such as spraying, brushing, roller coating and screen printing, can be used as well.

The solar absorptive layer is thereafter applied by depositing Ag/CuO/Rh/$Rh_2O_3$, in the form of an excess of one or more 5%–15% resinate solutions (total) or compatible mixtures thereof onto the silver-precoated substrate, by depositing the solution(s) on the rotational center of the substrate and the spin coater allowed to run for 15 seconds at about 600–2000 RPM. When platinum is included, a sufficient amount of a 5%–15% platinum resinate solution is admixed with one or more resinate solutions of the other components and applied by spin coating. The coated substrate is then dried and calcined in air, as before, at a temperature of about 400° C.–800° C. to obtain the desired thickness. Other means of application known to the art, such as spraying, brushing, roller coating and screen printing can also be used.

The solar absorptive layer thus obtained can comprise one or a plurality of solutions having a final combined thickness, up to about 10 microns and preferably within the range of about 0.1–4 micron.

Suitable resinate solutions for depositing various films or layers onto the substrate or as an interlayer or reflective layer, as above described, are conveniently prepared by treating an organic acid or mercaptan with the desired metal salt or combination of metal salts. The resulting product(s) consists of a metal atom bonded to sulphur or oxygen which, in turn, is bonded to carbon. When films formed from such material is fired, the organic portion is burned off to form a corresponding film of metal, metal oxide or cermet. Generally speaking, resinate solutions containing noble metals usually form true metal films, whereas resinate solutions of base metals result in the formation of metal oxide films. By blending noble metal and base metal resinate solutions, drying and firing, however, it is also possible to obtain cermet films comprised of metal and metal oxide mixtures under atmospheric conditions.

Certain absorber films possess optimum absorptance at predetermined film thicknesses and, therefore, the relationship between good optical properties and film thickness must be ascertained beforehand, in order to assure reproducibility of results.

Thickness of the solar absorber layer is a function of solution viscosity, including the solids content of the resinate solution, as well as spin coating time and revolution speed. Thus, for example, speeds up to 1200 RPM over a 10 second period have generally resulted in film layers having satisfactory properties.

It has been found that the following formula usefully applies:

$$\text{Film Thickness (cm)} = \frac{\text{Weight (g)}}{\text{Density (g/cm}^3) \times \text{Area (cm}^2)}$$

so that where density of a film is known, and the weight and area parameters ascertained, one may calculate desirable film thicknesses. Film thickness, in turn, can then be correlated with various optical properties to obtain a class of solar collectors, exhibiting maximum absorptance under test aging conditions (i.e., excessive heating over predetermined periods of time).

Figure 3:
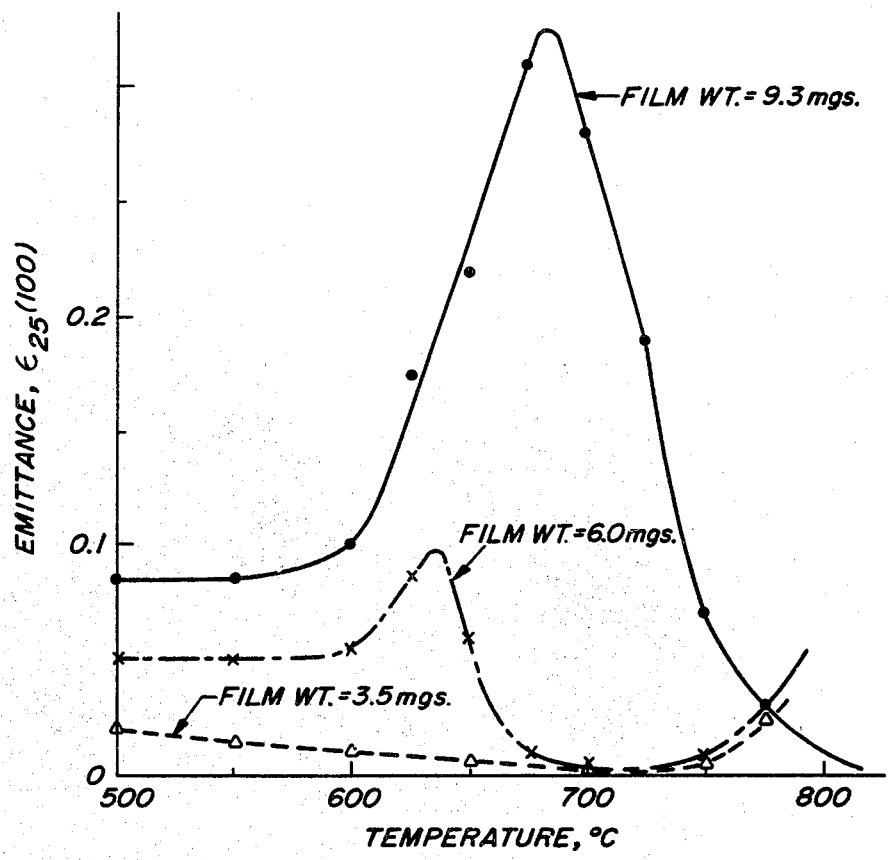
FIG. 3 is a graph of Emittance with Aging Temperature Variation (1 hr.) using silver precoated quartz.

In fact, improved stability is shown to be positively correlated with a decrease in film thickness (see FIG. 3), where emissivity levels $\xi_{25}(100)$ for the thinner films (i.e., 3.5 mg and 6.0 mg) remain at 0.1 or below at temperatures well in excess of 600° C., as opposed to thicker films (9.3 mg). This is clearly unexpected, in view of the fact that similar films deposited over a $CeO_2$ precoat on quartz do not demonstrate such relationship in comparable temperature ranges.

Tests have also been conducted to determine the effect of thermal aging on absorptive films containing $65Ag/7.0Pt/27.6CuO/0.4Rh_2O_3$ deposited on various metal substrates precoated with silver. (See Examples 6-8 and Table 9.) Such tests were conducted in air at temperatures in the range of 400° C.–600° C. over periods up to 2845 hours.

As above noted, the solar collectors of this invention include, as an optional feature, the use of anti-reflective coatings, such as metal oxides, inclusive of cerium oxide and tantalum oxide. Such coating(s) is conveniently applied to the surface of the absorptive film using a spin coating process which is essentially identical to the procedure herein described for depositing silver or silver/platinum onto the surface of quartz, silicate glass, or metal substrates. The use of such anti-reflective coating(s) serve(s) mainly to enhance the efficiency of the collector.

This invention is further described in detail by reference to specific embodiments, however, it is to be understood that such embodiments are presented for illustration and are not intended to be limitative of the invention as otherwise described herein.

EXAMPLE 1

ABSORBER FILM ON SILVER-COATED QUARTZ SUBSTRATE

STEP A:

Fifteen 1¾ inch diameter circular quartz coupons are individually coated by placing on a spin coater and adding identical amounts of 9% silver resinate solution and operating the coater for 11 seconds at 1000 RPM to evenly distribute the solution.

Each coupon is then dried at 125° C. for 30 minutes and calcined in air at a temperature of 550° C. for a period of 5 minutes. The resulting substrates possess a silver precoat having a thickness of about 0.2 micron.

STEP B: Absorber Film on Silver

One silver-coated quartz coupon obtained from Step A is mounted on a spin coater; a combined 9% resinate solution of silver, copper and rhodium is deposited on the coupon surface, and the spin coater operated at 800 RPM for 10 seconds to evenly distribute the solution. The substrate is air dried at 125° C. and calcined for 5 minutes at 550° C. to obtain an absorptive film of silver, copper oxide and rhodium/rhodium oxide having a uniform thickness of about 1.0 micron and a weight of about 9.3 mg. The composition of the absorptive layer is found to be 60% Ag, 39.6% CuO and 0.4% $Rh_2O_3$ by weight. The solar absorbance ($\alpha$) and emissivity values ($\xi$) exhibited by the coated coupons are then measured at ambient temperature in the manner described supra. and the results reported in Table 7 (Test 1).

The procedure of Step B is repeated with each of the remaining fourteen silver-coated quartz coupons, the speed and spin time being adjusted upward for each coupon to obtain processively smaller absorptive film weights and thickness, but the same proportion of metals. The resulting dried and calcined coupons are then tested at room temperature and the results reported in Table 7 (Tests 2-15 "Initial" Colums).

Each of the fifteen coupons are then thermally aged for one hour at 550° C., cooled, evaluated and returned to the oven for further aging at 600° C. and thereafter at progressively higher temperatures of one hour duration followed by cooling and evaluation. The test results are reported in Table 7.

The solar absorptance ($\alpha_{25}$) data of Example 1, and hereafter, is obtained by measuring the reflectance of the absorber film or coating at 25° C. using a Cary Model 14 commercial Spectrophotometer, and solar absorptance is calculated from hemispherical reflectance data by numerical integration of the following equation:

$$-(\alpha_{25}) = \int_{0.35}^{2.5} (1 - R_{25}(\lambda))F_{AM2}(\lambda)d\lambda$$

where $\lambda$ represents the wavelength of incident light, $R_{25}$ is the hemispherical reflectance measured at 25° C. and $F_{AM2}(\lambda)$ is the fraction of solar irradiance at air mass two (AM2) in the wavelength region dλ. The $F_{AM2}(\lambda)$ needed to determine absorptance ($\alpha_{25}$) is reported in "The Proceedings of D.O.E./D.S.T. Thermal Power System Workshop on Selective Absorber Coatings", authored by J. C. Richmond of the Solar Energy Research Institute, Golden, Colo. (1977).

The hemispherical emittance, $\xi_{25}(100)$, for test Ag/CuO/Rh/Rh$_2$O$_3$ films of this invention is obtained with a TAL Ambient Emissometer.

Auger analyses of the films also was used to confirm the presence of a graded composite structure with the metal phase concentrated at the substrate surface and the oxide phase concentrated at the opposite side.

The improved stability and optical properties for the absorber films prepared according to Example 1 is further demonstrated in Example 2 by identical comparison with quartz substrates onto which is applied a cerium oxide precoat or interlayer, rather than a silver precoat.

EXAMPLE 2

CERIUM OXIDE PRECOAT ON QUARTZ SUBSTRATE (CONTROL)

STEP A: Quartz-Cerium Oxide

Ten clean quartz coupons identical to those of Example 1, are individually mounted on a spin coater and 9% cerium resinate solution deposited thereon in identical amounts and mounted on a spin coater, operated for 10 seconds at 1000 RPM to apply a uniform cerium-resinate coating on each coupon.

The coupons are then identically dried and calcined in air at a temperature of about 550° C. for 5 minutes to convert the cerium resinate to cerium oxide of about 0.25 micron thickness.

STEP B: Absorber Film on Cerium Oxide

A 9% combined resinate solution of silver, copper and rhodium, identical in amount and kind to that used in Example 1, is then deposited onto each of the ten cerium oxide-coated coupons of Step A, and spin coated, the speed and spin time being adjusted upwards with each coupon to obtain progressively smaller absorptive film weight and thickness, but the same proportion of metals. The coupons are then dried and calcined as described in Step B of Example 1. The resulting test coupons are found to have an absorptive coating about 0.5 micron thick, containing about 60% silver, 39.6% copper oxide and 0.4% rhodium oxide by weight.

The absorptance level and emissivity efficiency is determined, as in Example 1 Step B, before and after thermal aging for one (1) hour at various temperature differentials between 500° C.–700° C., and the results recorded in Table 8 as a control.

The following example reports test coupons in which a platinum component is included in the absorptive layer.

EXAMPLE 3

PLATINUM CONTAINING ABSORBER FILM ON SILVER PRECOATED QUARTZ

STEP A: Silver Coated Quartz

Two clean quartz coupons are placed on a spin coater and an excess 9% silver resinate solution placed at its rotational center. The spin coater is then operated and the coupons dried and calcined according to the procedure described in Step A of Example 1, to obtain evenly distributed thin silver precoat films of about 0.2 micron thickness.

STEP B: Platinum Containing Absorber Film on Silver

The silver-coated quartz coupons obtained according to Step A are then individually placed on a spin coater and identical amounts of combined 9% resinate solutions containing Ag, Pt, Cu, and Rh placed at their rotational centers. The coater is then spun for 11 seconds at 1000 RPM and each coupon dried and calcined at 550° C. for 5 minutes as in Example 1, to obtain an absorptive film calculated in percent by weight as 65Ag/7.0Pt/27.6CuO/0.4Rh$_2$O$_3$.

The resulting test coupons are then individually thermally aged at 550° C., the material cooled, and its emissivity level determined and recorded in Table 1 at 0, 100, 200, 500 and 1000 hours. After aging, the weight percent composition of the absorptive film on the coupons is checked and found to agree with the earlier calculations at 65Ag/7.0Pt/27.6CuO/0.4Rh$_2$O$_3$.

The emittance stability of absorber films, as demonstrated in Examples 1 and 3, is found to be substantially better than demonstrated by corresponding film deposited on cerium oxide precoats of Example 2. This result is further illustrated by comparison of the emittance of absorptive films containing 0% Pt with thermal aging where a silver precoat (Table 7) and a cerium oxide precoat (Table 8) is used.

Auger depth profiling indicates that such absorptive films comprised of platinum and conforming to the composition Ag/Pt/CuO/Rh/Rh$_2$O$_3$ consist essentially of CuO at the top surface and metallic silver at the bottom surface.

TABLE 1

| Emissivity Versus Aging Time at 550° C. In Air for Films Prepared in Example 3 | |
|---|---|
| Aging Time (Hours) | Emissivity |
| 0 | <0.03 |
| 100 | <0.03 |
| 200 | <0.03 |
| 500 | <0.03 |
| 1000 | 0.035 |

EXAMPLE 4

ABSORBER FILM ON SILVER PRECOATED QUARTZ

STEP A: Silver Coated Quartz

A clean quartz coupon was coated using the procedure described in Example 1—Step A.

STEP B: Absorber Film on Silver Precoated Quartz

The silver-coated quartz coupon obtained according to Step A is placed on a spin coater and an excess of 9% resinate solution containing silver, copper and rhodium placed at its rotational center. The spin is operated for 11 seconds at 1000 RPM. The coupon is then dried at 125° C. for 30 minutes and then calcined at a temperature of 550° C. for a period of 5 minutes. The composition of the resulting absorber film was 60 silver-39.6 copper dioxide-0.4 rhodium oxide.

The emissivity of the films were measured initially using techniques described previously. The films were aged for various times up to 1000 hours at 550° C. in air. The resulting emissivity data are reported in Table 2.

TABLE 2

Emissivity Versus Aging Time at 550° C.
In Air For Films Prepared in Example 4

| Aging Time (Hours) | Emissivity |
|---|---|
| 0 | <0.03 |
| 100 | <0.03 |
| 200 | <0.03 |
| 500 | <0.03 |
| 1000 | 0.22 |

EXAMPLE 5

PLATINUM CONTAINING ABSORBER FILM ON SILVER INTERLAYER AND 406 STAINLESS STEEL SUBSTRATE

STEP A: Silver-Coated 406 Stainless Steel Substrate

Two clean test coupons of 406 stainless steel are placed on the vacuum chuck of a spin coater and 9% silver resinate solution deposited therein in accordance with the procedure described in Example 1, Step A, to obtain a single thin silver interlayer of about 0.4 micron.

STEP B: Platinum Containing Absorber Film on Silver

The procedure described in Example 3, Step B, is then used to apply a 65Ag/7.0Pt/27.6CuO/0.4Rh$_2$O$_3$ absorptive film. The resulting system was isothermally aged in a furnace at 400° C. under air for an extended period as follows:

The test coupons are periodically removed from a furnace operating under air at 1 atmosphere and 400° C., cooled to room temperature, evaluated and returned to the furnace for additional aging, up to a cumulative total of 2845 hours. Evaluation of the test coupons is reported in Tables 3 and 9, infra.

TABLE 3

(Ref. Example 5)

|  | Initial | 275 Hours | 1020 Hours | 1765 Hours | 2845 Hours |
|---|---|---|---|---|---|
| Sample 1 |  |  |  |  |  |
| $\xi_{25}(100)$ | 0.15 | 0.18 | 0.23 | 0.36 | 0.45 |
| $\alpha_{25}$ | 0.88 | 0.88 | 0.86 | 0.86 | 0.88 |
| Sample 2 |  |  |  |  |  |
| $\xi_{25}(100)$ | 0.14 | 0.18 | 0.24 | 0.32 | 0.55 |
| $\alpha_{25}$ | 0.87 | 0.87 | 0.85 | 0.86 | 0.87 |

EXAMPLE 6

PLATINUM CONTAINING ABSORBER FILM ON SILVER INTERLAYER AND PREOXIDIZED 406 STAINLESS STEEL SUBSTRATE

STEP A: Preoxidation of 406 Stainless Steel Substrate

Two clean test coupons of 406 stainless steel, identical with those of Example 5, are preoxidized by heating to 1000° C. for one hour under air. A silver interlayer is then applied in accordance with Step A of Example 5 to obtain a single thin silver interlayer of about 0.4 micron.

STEP B: Platinum Containing Absorber Film on Silver

An absorptive layer is then applied utilizing the procedure of Example 5, Step B, to obtain an absorptive film. After calcining, the resulting test coupons, having an absorptive film concentration of 65Ag/7.0Pt/27.6CuO/0.4Rh$_2$O$_3$, are isothermally aged at 400° C., as in Example 5, tested, and reported in Tables 4 and 9, infra.

TABLE 4

(Ref. Example 6)

|  | Initial | 274 Hours | 1020 Hours | 1766 Hours | 2845 Hours |
|---|---|---|---|---|---|
| Sample 1 |  |  |  |  |  |
| $\xi_{25}(100)$ | 0.12 | 0.15 | 0.13 | 0.16 | 0.18 |
| $\alpha_{25}$ | 0.88 | 0.86 | 0.85 | 0.86 | 0.87 |
| Sample 2 |  |  |  |  |  |
| $\xi_{25}(100)$ | 0.13 | 0.15 | 0.15 | 0.16 | 0.18 |
| $\alpha_{25}$ | 0.86 | 0.85 | 0.85 | 0.85 | 0.86 |

The effect of the preoxidation treatment on the stability of the absorber is readily apparent when the $\xi_{25}(100)$ values are compared in Examples 5 and 6. A more effective diffusion barrier is formed by the preoxidation treatment and, hence, the elements in the metal substrate do not diffuse into the absorber to degrade the optical properties, especially the emittance values.

EXAMPLE 7

PLATINUM CONTAINING ABSORBER FILM ON SILVER-COATED KANTHAL A-1 SUBSTRATE

STEP A:

Step A of Examples 5 and 6 was repeated using four identical clean test coupons of Kanthal A-1, two being preoxidized prior to application of the silver interlayer.

STEP B:

The procedures described in Example 5, Step B, were then followed to apply a 65Ag/7.0Pt/27.6CuO/0.4Rh$_2$O$_3$ absorptive film to each test coupon, the coupons were tested, isothermally aged and retested, and the results reported in Table 5, infra.

TABLE 5

(Ref. Example 7)

|  | Initial | 274 Hours | 1020 Hours | 1765 Hours | 2845 Hours |
|---|---|---|---|---|---|
| Sample 1* |  |  |  |  |  |
| $\xi_{25}(100)$ | 0.12 | 0.14 | 0.15 | 0.14 | 0.28 |
| $\alpha_{25}$ | 0.88 | 0.86 | 0.83 | 0.87 | 0.87 |
| Sample 2* |  |  |  |  |  |
| $\xi_{25}(100)$ | 0.09 | 0.10 | 0.13 | 0.14 | 0.14 |
| $\alpha_{25}$ | 0.87 | 0.85 | 0.82 | 0.85 | 0.87 |
| Sample 3** |  |  |  |  |  |
| $\xi_{25}(100)$ | 0.12 | 0.10 | 0.15 | 0.18 | 0.21 |
| $\alpha_{25}$ | 0.88 | 0.85 | 0.86 | 0.85 | 0.87 |
| Sample 4** |  |  |  |  |  |
| $\xi_{25}(100)$ | 0.14 | 0.15 | 0.18 | 0.17 | 0.21 |
| $\alpha_{25}$ | 0.88 | 0.86 | 0.86 | 0.87 | 0.87 |

*Clean Substrates of Kanthal A-1
**Kanthal A-1 Substrate Preoxidized

EXAMPLE 8

PLATINUM CONTAINING ABSORBER FILM ON SILVER-FECRALLOY SUBSTRATE

STEP A:

Step A of Example 7 is repeated using four clean Fecralloy test coupons as substrate, two being preoxidized prior to application of the silver interlayer.

STEP B:

The procedure described in Example 7, Step B is used then followed apply a 65Ag/7.0Pt/27.6CuO/0.4Rh$_2$O$_3$ absorptive film onto each test coupon, the coupons coated, aged isothermally at 400° C., retested and the test data reported in Table 6, infra.

TABLE 6

| | (Ref. Example 8) | | | | |
|---|---|---|---|---|---|
| | Initial | 274 Hours | 1020 Hours | 1765 Hours | 2845 Hours |
| Sample 1* | | | | | |
| $\xi_{25}(100)$ | 0.08 | 0.16 | 0.16 | 0.22 | 0.24 |
| $\alpha_{25}$ | 0.87 | 0.85 | 0.85 | 0.86 | 0.87 |
| Sample 2* | | | | | |
| $\xi_{25}(100)$ | 0.07 | 0.10 | 0.10 | 0.10 | 0.13 |
| $\alpha_{25}$ | 0.88 | 0.86 | 0.84 | 0.86 | 0.87 |

TABLE 6-continued

| | (Ref. Example 8) | | | | |
|---|---|---|---|---|---|
| | Initial | 274 Hours | 1020 Hours | 1765 Hours | 2845 Hours |
| Sample 3** | | | | | |
| $\xi_{25}(100)$ | 0.07 | 0.09 | 0.11 | 0.09 | 0.14 |
| $\alpha_{25}$ | 0.87 | 0.86 | 0.84 | 0.86 | 0.87 |
| Sample 4** | | | | | |
| $\xi_{25}(100)$ | 0.19 | 0.18 | 0.20 | 0.19 | 0.21 |
| $\alpha_{25}$ | 0.88 | 0.86 | 0.86 | 0.87 | 0.88 |

*clean substrates of Fecralloy
**Fecralloy Substrate Preoxidized

TABLE 7

ABSORBER FILM
OPTICAL PROPERTIES OF 60Ag/39.6 CuO/0.4Rh$_2$O$_3$ SILVER PRECOATED QUARTZ SUBSTRATE

| TEST | FILM WT. (MG) | $\alpha_{25}$ INITIAL | $\alpha_{25}$ 650° C. | $\xi_{25}(100)$ Initial | 550° C. | 600° C. | 625° C. | 650° C. | 675° C. | 700° C. | 725° C. | 750° C. | 775° C. |
|---|---|---|---|---|---|---|---|---|---|---|---|---|---|
| 1 | 9.30 | 0.84 | 0.85 | 0.09 | 0.09 | 0.10 | 0.16 | 0.22 | 0.31 | 0.28 | 0.18 | 0.16 | 0.03 |
| 2 | 8.95 | 0.81 | 0.83 | 0.08 | 0.08 | 0.08 | 0.13 | 0.20 | 0.30 | 0.22 | 0.11 | 0.03 | <0.03 |
| 3 | 8.75 | 0.84 | 0.85 | 0.08 | 0.08 | 0.10 | 0.15 | 0.17 | 0.24 | 0.08 | <0.03 | <0.03 | 0.03 |
| 4 | 8.39 | 0.80 | 0.83 | 0.06 | 0.06 | 0.05 | 0.07 | 0.08 | 0.14 | 0.08 | <0.03 | <0.03 | <0.03 |
| 5 | 7.29 | 0.83 | 0.84 | 0.06 | 0.08 | 0.05 | 0.06 | 0.06 | 0.07 | 0.07 | <0.03 | <0.03 | <0.03 |
| 6 | 7.18 | 0.80 | 0.83 | 0.06 | 0.08 | 0.04 | 0.06 | 0.06 | 0.07 | <0.03 | <0.03 | <0.03 | <0.03 |
| 7 | 6.15 | 0.82 | 0.81 | 0.06 | 0.08 | 0.06 | 0.06 | 0.07 | 0.03 | <0.03 | <0.03 | <0.03 | 0.04 |
| 8 | 6.09 | 0.80 | 0.80 | 0.05 | 0.08 | 0.06 | 0.09 | 0.07 | 0.03 | <0.03 | <0.03 | <0.03 | 0.04 |
| 9 | 5.58 | 0.81 | 0.81 | 0.04 | 0.04 | 0.06 | 0.06 | 0.07 | 0.03 | <0.03 | <0.03 | <0.03 | 0.03 |
| 10 | 5.05 | 0.82 | 0.82 | 0.04 | 0.04 | 0.03 | <0.03 | <0.03 | <0.03 | <0.03 | <0.03 | <0.03 | 0.04 |
| 11 | 4.94 | 0.84 | 0.80 | 0.03 | 0.03 | 0.03 | 0.04 | 0.03 | 0.04 | 0.03 | <0.03 | <0.03 | 0.04 |
| 12 | 4.93 | 0.82 | 0.82 | 0.03 | 0.03 | 0.03 | 0.05 | 0.04 | <0.03 | <0.03 | <0.03 | <0.03 | <0.03 |
| 13 | 4.45 | 0.86 | 0.85 | <0.03 | <0.03 | <0.03 | 0.03 | 0.04 | <0.03 | <0.03 | <0.03 | <0.03 | <0.03 |
| 14 | 4.17 | 0.88 | 0.89 | <0.03 | <0.03 | <0.03 | <0.03 | <0.03 | <0.03 | <0.03 | <0.03 | <0.03 | <0.03 |
| 15 | 3.82 | 0.87 | 0.87 | <0.03 | <0.03 | <0.03 | <0.03 | <0.03 | <0.03 | <0.03 | <0.03 | <0.03 | <0.03 |

TABLE 8

(Control)
OPTICAL PROPERTIES OF ABSORBER FILMS ON CERIUM OXIDE BEFORE AND AFTER AGING

| I.D. | FILM WT. (MG) | $\alpha_{25}$ INITIAL | $\alpha_{25}$ 650° C. | $\xi_{25}(100)$ INITIAL | 550° | 550° | 600° | 625° | 650° | 675° | 700° |
|---|---|---|---|---|---|---|---|---|---|---|---|
| 1 | 8.28 | 0.76 | 0.74 | 0.05 | 0.05 | 0.07 | 0.09 | 0.16 | 0.20 | 0.32 | 0.38 |
| 2 | 7.21 | 0.82 | 0.77 | 0.03 | 0.03 | 0.03 | 0.03 | 0.05 | 0.10 | 0.25 | 0.34 |
| 3 | 6.49 | 0.83 | 0.82 | 0.03 | <0.03 | <0.03 | <0.03 | 0.04 | 0.07 | 0.21 | — |
| 4 | 6.41 | 0.86 | 0.81 | <0.03 | <0.03 | <0.03 | <0.03 | 0.04 | 0.08 | 0.24 | 0.32 |
| 5 | 5.43 | 0.88 | 0.88 | <0.03 | <0.03 | <0.03 | <0.03 | <0.03 | 0.03 | 0.09 | 0.18 |
| 6 | 4.89 | 0.89 | 0.87 | <0.03 | <0.03 | <0.03 | <0.03 | 0.03 | 0.04 | 0.15 | 0.28 |
| 7 | 4.84 | 0.89 | 0.83 | 0.06 | 0.07 | 0.06 | 0.08 | 0.14 | 0.20 | 0.34 | 0.38 |
| 8 | 4.39 | 0.88 | 0.83 | 0.10 | 0.15 | 0.15 | 0.15 | 0.17 | 0.25 | 0.37 | >0.40 |
| 9 | 4.01 | 0.87 | 0.81 | 0.26 | 0.26 | 0.29 | 0.32 | 0.37 | 0.37 | >0.40 | >0.40 |
| 10 | 3.82 | 0.85 | 0.83 | 0.33 | 0.32 | 0.33 | 0.33 | 0.36 | 0.37 | >0.40 | >0.40 |

TABLE 9

Thermal Aging Data For Absorber Films 65Ag/7.0Pt/27.6CuO/0.4Rh$_2$O$_3$ Deposited on Metal Substrates Precoated With Silver

| Substrate | Substrate Oxidized | $\alpha_{25}^{0*}$ | $\alpha_{25}^{130*}$ | $\alpha_{25}^{274*}$ | $\alpha_{25}^{540*}$ | $\alpha_{25}^{1020*}$ | $\alpha_{25}^{1596*}$ | $\alpha_{25}^{1765*}$ | $\alpha_{25}^{2845*}$ |
|---|---|---|---|---|---|---|---|---|---|
| Kanthal A-1 | No | 0.88 | 0.86 | 0.86 | 0.86 | 0.83 | 0.85 | 0.87 | — |
| Kanthal A-1 | No | 0.87 | 0.85 | 0.85 | 0.85 | 0.82 | 0.85 | 0.85 | 0.87 |
| Kanthal A-1 | Yes | 0.88 | 0.86 | 0.85 | 0.85 | 0.86 | 0.85 | 0.85 | 0.87 |
| Kanthal A-1 | Yes | 0.88 | 0.86 | 0.86 | 0.86 | 0.86 | 0.85 | 0.87 | 0.87 |
| Fecralloy | No | 0.87 | 0.85 | 0.85 | 0.85 | 0.85 | 0.85 | 0.86 | 0.87 |
| Fecralloy | No | 0.88 | 0.86 | 0.86 | 0.85 | 0.84 | 0.85 | 0.86 | 0.87 |
| Fecralloy | Yes | 0.87 | 0.85 | 0.86 | 0.85 | 0.84 | 0.85 | 0.86 | 0.87 |
| Fecralloy | Yes | 0.88 | 0.86 | 0.86 | 0.86 | 0.86 | 0.86 | 0.87 | 0.88 |
| S.S. #406 | No | 0.88 | 0.86 | 0.86 | 0.86 | 0.86 | 0.85 | 0.86 | 0.88 |
| S.S. #406 | No | 0.87 | 0.85 | 0.85 | 0.84 | 0.85 | 0.84 | 0.86 | 0.87 |
| S.S. #406 | Yes | 0.88 | 0.85 | 0.86 | 0.85 | 0.85 | 0.85 | 0.86 | 0.87 |
| S.S. #406 | Yes | 0.86 | 0.84 | 0.85 | 0.84 | 0.84 | 0.84 | 0.85 | 0.86 |

| Substrate | Substrate Oxidized | $\epsilon_{25}^{0*}(100)$ | $\epsilon_{25}^{130*}(100)$ | $\epsilon_{25}^{274*}(100)$ | $\epsilon_{25}^{540*}(100)$ | $\epsilon_{25}^{1020*}(100)$ | $\epsilon_{25}^{1596*}(100)$ | $\epsilon_{25}^{1765*}(100)$ | $\epsilon_{25}^{2845*}(100)$ |
|---|---|---|---|---|---|---|---|---|---|
| Kanthal A-1 | No | 0.12 | 0.16 | 0.14 | 0.17 | 0.15 | 0.14 | 0.14 | 0.28 |
| Kanthal A-1 | No | 0.09 | 0.15 | 0.10 | 0.13 | 0.13 | 0.10 | 0.14 | 0.14 |

TABLE 9-continued

Thermal Aging Data For Absorber Films 65Ag/7.0Pt/27.6CuO/
0.4Rh$_2$O$_3$ Deposited on Metal Substrates Precoated With Silver

| | | | | | | | | | |
|---|---|---|---|---|---|---|---|---|---|
| Kanthal A-1 | Yes | 0.12 | 0.18 | 0.10 | 0.18 | 0.15 | 0.15 | 0.18 | 0.21 |
| Kanthal A-1 | Yes | 0.14 | 0.18 | 0.15 | 0.18 | 0.18 | 0.16 | 0.17 | 0.21 |
| Fecralloy | No | 0.08 | 0.12 | 0.16 | 0.18 | 0.16 | 0.18 | 0.22 | 0.24 |
| Fecralloy | No | 0.07 | 0.10 | 0.10 | 0.10 | 0.10 | 0.18 | 0.10 | 0.13 |
| Fecralloy | Yes | 0.07 | 0.11 | 0.09 | 0.10 | 0.11 | 0.09 | 0.09 | 0.14 |
| Fecralloy | Yes | 0.19 | 0.18 | 0.18 | 0.20 | 0.20 | 0.20 | 0.19 | 0.21 |
| S.S. #406 | No | 0.15 | 0.19 | 0.18 | 0.20 | 0.23 | 0.36 | 0.36 | 0.45 |
| S.S. #406 | No | 0.14 | 0.18 | 0.18 | 0.18 | 0.24 | 0.32 | 0.32 | 0.55 |
| S.S. #406 | Yes | 0.12 | 0.16 | 0.15 | 0.13 | 0.13 | 0.14 | 0.16 | 0.18 |
| S.S. #406 | Yes | 0.13 | 0.15 | 0.15 | 0.15 | 0.15 | 0.15 | 0.16 | 0.18 |

*Denotes hours of thermal aging at 400° C. in air.

What is claimed is:

1. A solar energy collector of improved thermal stability comprising:
   (a) a substrate selected from the group consisting of quartz, silicate glass, and a stainless steel;
   (b) a solar absorptive layer containing silver, copper oxide, rhodium/rhodium oxide and 0%–15% by weight of platinum;
   (c) an interlayer comprising silver or silver/platinum in contact with said solar absorptive layer and said substrate.

2. A solar collector of claim 1, in which the absorptive layer has at least one anti-reflective coating.

3. The solar collector of claim 2, in which the anti-reflective coating comprises cerium oxide.

4. The solar collector of claim 2, wherein the (b) component contains about 50%–75% by weight silver, 9%–49.9% by weight copper oxide, 0.1%–1% by weight rhodium/rhodium oxide, and 0%–15% by weight platinum.

5. The solar collector of claim 4, wherein said absorptive layer contains about 1–8% by weight platinum.

6. The solar collector of claim 2, wherein the interlayer comprises 100%–75% silver/0%–25% platinum by weight.

7. The solar collector of claim 6, wherein the thickness of the silver/platinum interlayer is about 0.1–1 micron.

8. The solar collector of claim 1, wherein the (b) component contains about 50%–90% by weight silver, 9%–49.9% by weight copper oxide, 0.1%–1% by weight rhodium/rhodium oxide, and 0%–15% by weight platinum.

9. The solar collector of claim 8, wherein the thickness of the absorptive film is about 0.1–4 micron.

10. The solar collector of claim 8, wherein the substrate component is quartz.

11. The solar collector of claim 8, wherein the (a) substrate component is stainless steel.

12. The solar collector of claim 8, wherein the substrate component is a silicate glass.

13. The solar collector of claim 1, wherein the (b) component contains about 50%–75% by weight silver, 9%–49.9% by weight copper oxide, 0.1%–1% by weight rhodium/rhodium oxide, and 0%–15% by weight platinum.

14. The solar collector of claim 13, wherein the absorptive layer contains about 1–8% by weight platinum.

15. The solar collector of claim 1, wherein the (b) component contains about 50%–65% by weight silver, 33.3%–44.7% by weight copper oxide, 0.3%–0.7% by weight rhodium/rhodium oxide, and 0%–15% by weight platinum.

16. The solar collector of claim 1, wherein the (c) interlayer consists essentially of a thin silver film.

17. The solar collector of claim 16, wherein the absorptive layer contains 60% by weight silver, 37.6% by weight copper oxide, 0.4% by weight rhodium/rhodium oxide and 2% by weight platinum.

18. The solar collector of claim 16, wherein said absorptive film contains 65% by weight silver, 27.6% by weight copper oxide, 0.4% rhodium/rhodium oxide and 7.0% platinum by weight.

19. The solar collector of claim 16, wherein the thickness of the silver interlayer is about 0.1–1 micron.

20. A method for preparing a solar energy collector of improved thermal stability, which comprises:
   (A) uniformly depositing a thin silver-, or silver/platinum-interlayer onto a substrate selected from the group consisting of quartz, silicate glass, and stainless steel;
   (B) drying and calcining the coated substrate, at a temperature up to about 800° C.;
   (C) uniformly depositing silver, copper oxide, rhodium/rhodium oxide and 0–15% platinum onto the surface of the silver- or silver/platinum-coated substrate; and
   (D) drying and calcining the coated substrate, to obtain the desired collector.

21. The method of claim 20, wherein one or more anti-reflective layers are added as part of the absorptive layer.

22. The method according to claim 20, wherein said silver or silver/platinum film is applied as a single thin layer by spin coating a resinate solution of silver or silver/platinum deposited onto the surface of said substrate.

23. The method according to claim 20, wherein said absorptive film is deposited in the form of a single layer by spin coating one or more resinate solutions onto the surface of said substrate, dried and calcined.

* * * * *